Figure 1:
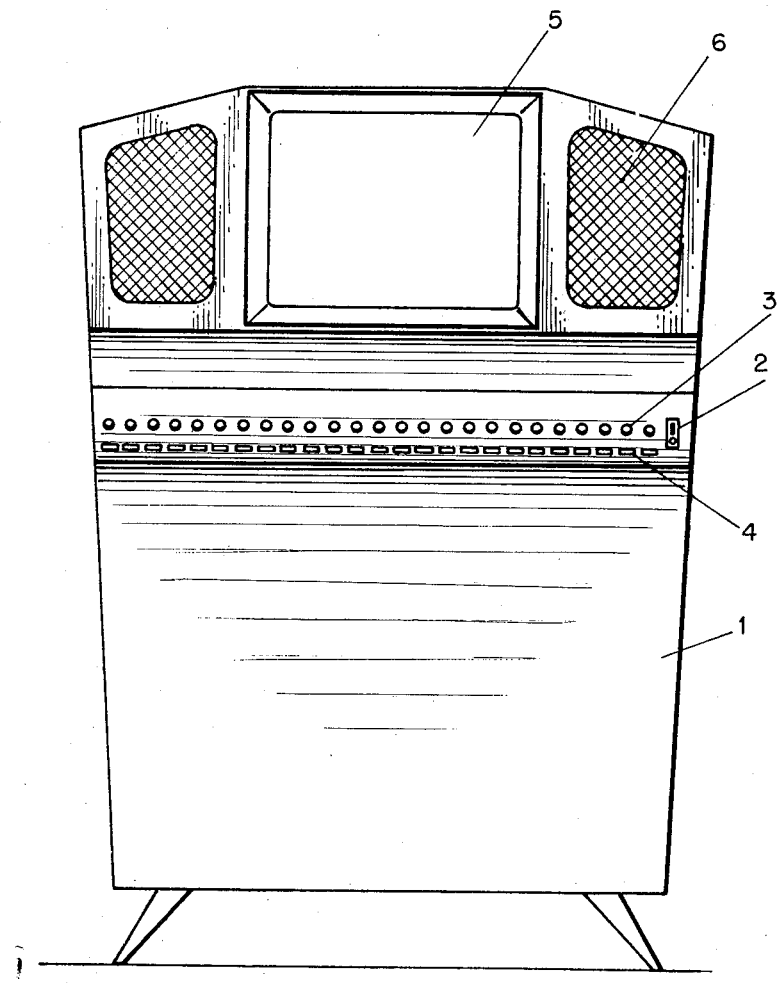

July 24, 1962 A. L. F. PRAT 3,045,537
APPARATUS FOR THE AUTOMATIC PROJECTION OF SELECTED SOUND FILMS
Filed July 24, 1959 5 Sheets-Sheet 1

Inventor:
ANDRE LUCIEN FELIX PRAT
Attorney

July 24, 1962     A. L. F. PRAT     3,045,537
APPARATUS FOR THE AUTOMATIC PROJECTION OF SELECTED SOUND FILMS
Filed July 24, 1959     5 Sheets-Sheet 2

Inventor:

ANDRE LUCIEN FELIX PRAT by: J. DeBatten-Segny
Attorney

July 24, 1962     A. L. F. PRAT     3,045,537
APPARATUS FOR THE AUTOMATIC PROJECTION OF SELECTED SOUND FILMS
Filed July 24, 1959     5 Sheets-Sheet 3
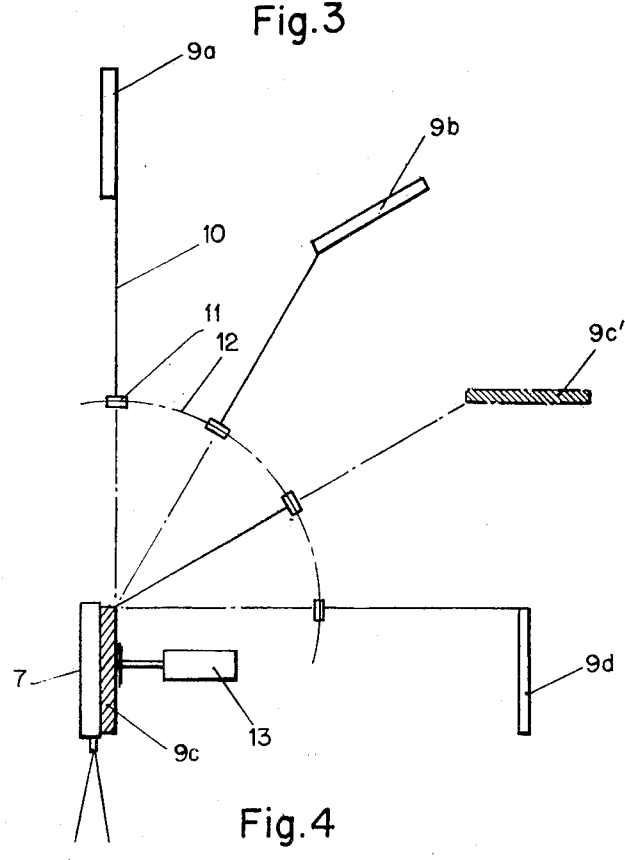
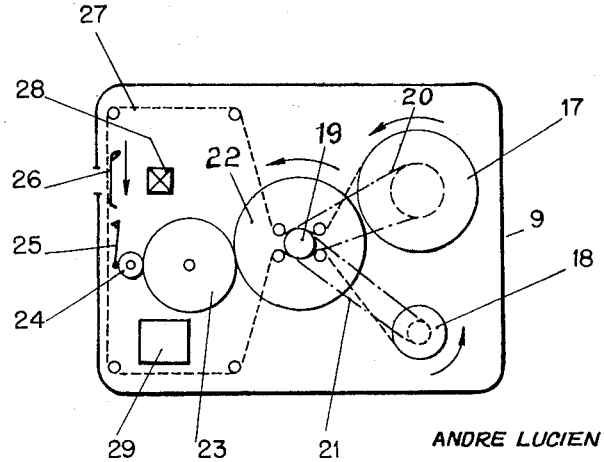
Inventor:
ANDRE LUCIEN FELIX PRAT
by J. Delattre-Seguy
Attorney July 24, 1962   A. L. F. PRAT   3,045,537
APPARATUS FOR THE AUTOMATIC PROJECTION OF SELECTED SOUND FILMS
Filed July 24, 1959   5 Sheets-Sheet 4

Inventor:
ANDRE LUCIEN FELIX PRAT
by: J. Delattre-Seguy
Attorney

July 24, 1962 A. L. F. PRAT 3,045,537
APPARATUS FOR THE AUTOMATIC PROJECTION OF SELECTED SOUND FILMS
Filed July 24, 1959 5 Sheets-Sheet 5

Inventor:
ANDRE LUCIEN FELIX PRAT
by: J. Delattre-Seguy
Attorney

United States Patent Office 3,045,537
Patented July 24, 1962

3,045,537
APPARATUS FOR THE AUTOMATIC PROJECTION OF SELECTED SOUND FILMS
Andre Lucien Felix Prat, 15 Ave. Dufau, Pau, Basses Pyrenees, France, assignor of one-third to Eric Benedic, Paris, France
Filed July 24, 1959, Ser. No. 829,415
Claims priority, application France July 31, 1958
5 Claims. (Cl. 88—16.2)

Our invention has for its object an apparatus for projecting sound films, which provides for the entirely automatic projection of any film whatever, selected from a plurality of available films. In a preferred embodiment, said apparatus is constituted by a sort of juke box including a keyboard for the selection of a film after introduction of a coin into the apparatus.

Our improved apparatus comprises, in combination, stationary reproducing means constituted chiefly by projecting elements, acoustic and reading reproducing elements and film-dividing elements, individual magazines carrying each a film and its control mechanism and means adapted to bring each magazine from an inoperative position into an operative position for which it cooperates with said reproducing means and, lastly, control means providing for the automatic execution of a complete cycle of operation including the selection of a film, the shifting of the corresponding magazine into its operative position, the projection of the film and the acoustic reproduction of its sound, the return of the magazine into its inoperative position and the return of the whole system into its starting condition.

According to a further feature of our invention, the individual magazines are brought into their operative position through a compound movement constituted by a first, pivotal movement round an axis arranged in such manner that the pivotal axes for all the magazines lie on an arcuate line, said pivotal movement being followed by a second, translational movement.

According to another feature of our invention, the pivotal movements are controlled by a plurality of different motors for the pivotal movement of the corresponding magazines, while a translationally acting push-member is common to all the magazines.

According to a still further feature of our invention, the passage from certain operations of the cycle to the next operation is ensured by means responsive to the movement of the film.

According to yet another feature of our invention, the control means responsive to the movement of the film are constituted in practice by photoelectric means, to wit: by reference marks carried at the beginning and by the end of each film and scanned by a photocell incorporated with the reproducing means.

Figure 2:
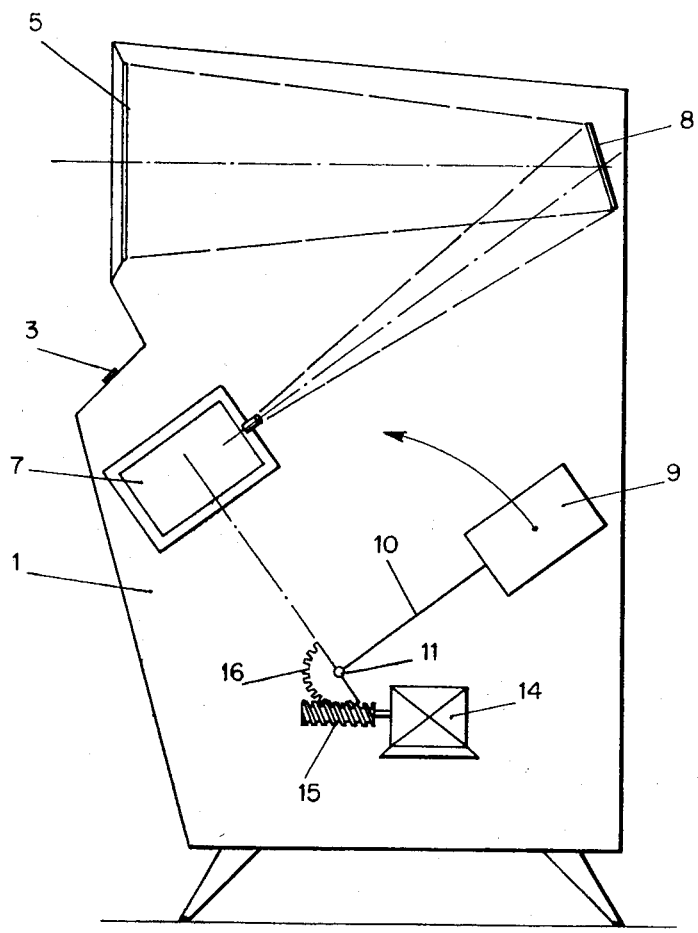
Figure 5:
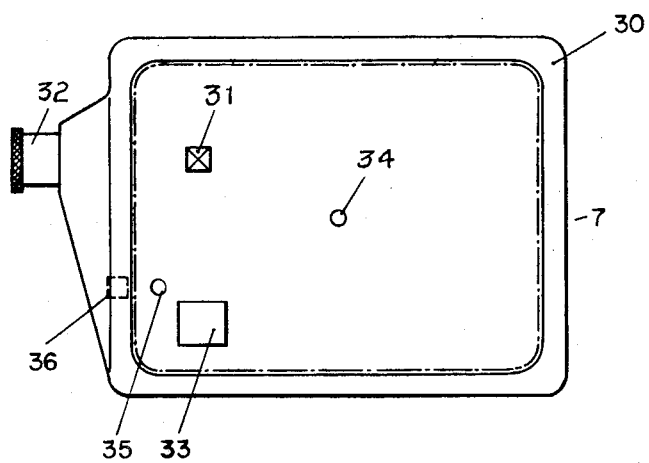
Figure 6:
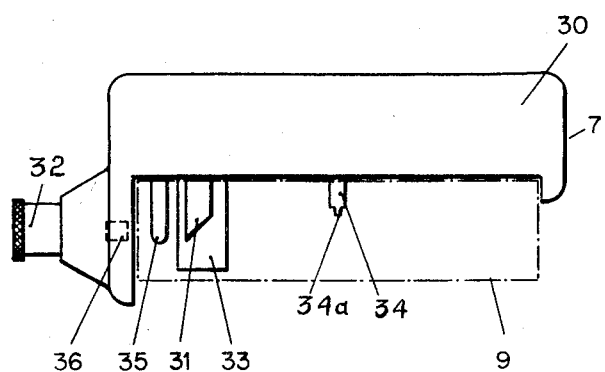
Figure 7:
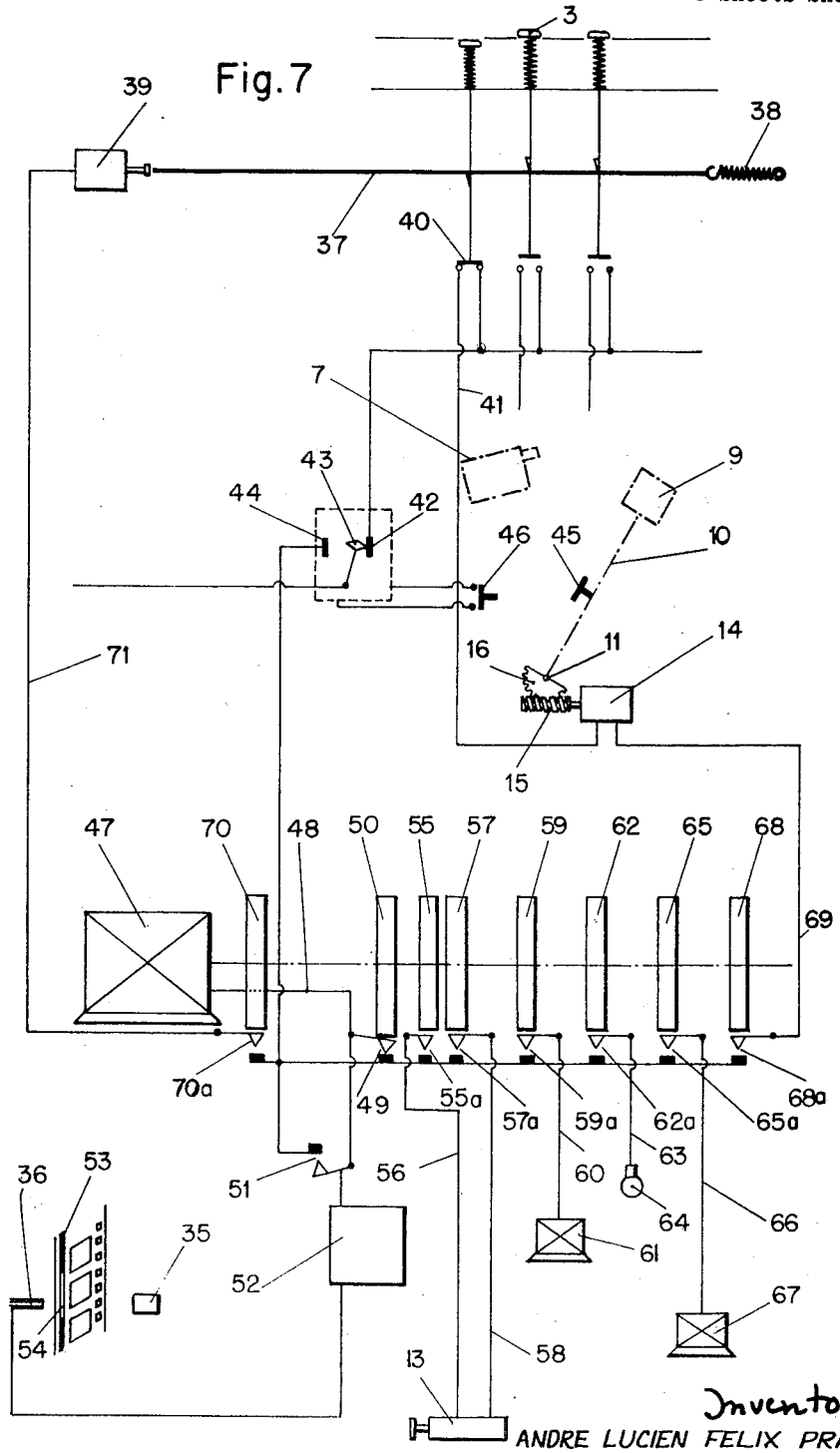

Still further features and advantages of our invention will appear from the reading of the following description, reference being made to the accompanying drawings, wherein:

FIG. 1 is a front view of our improved apparatus.
FIG. 2 is a transverse diagrammatic cross-sectional view thereof.
FIG. 3 is a diagram showing the movements of the different magazines.
FIG. 4 is a diagrammatic longitudinal cross-section of a magazine.
FIG. 5 is an elevational view of the projector.
FIG. 6 is a plan view of the latter.
FIG. 7 is a wiring diagram of the whole arrangement.

As illustrated in FIG. 1, the apparatus appears as a whole in the shape of a juke box. It includes a casing 1, a slot 2 for the introduction of a coin, a row of selecting knobs 3 associated with reference marks 4, a ground glass projection screen 5 and loud-speakers 6. The casing 1 encloses a system for projection and sound reproduction, as shown at 7 in FIG. 2, together with a mirror 8 reflecting the rays formed by the projector and impinging on the ground glass screen 5.

The relative location of the elements 5, 7, 8 and also the size of the screen 5 are selected in a manner such as to ensure the projection of a clear picture even with a projector of a reduced power. Thus, for instance, the screen may be given a size of 50 x 38 cm., the distance between the screen and the projector being equal to about 1.80 meter.

The casing 1 contains, furthermore, a number of separate magazines 9 containing each a film and adapted to cooperate selectively with the projection system 7.

Although it is possible to use special films, with a double row of pictures or the like, we prefer using conventional films of the size of say 16 mm. with a single row of perforations associated with a broad magnetic sound track, said film being projected at the rhythm of 24 pictures per second. During projection, the film is in a reversed position, so that its right-hand side is shifted to the left with a view to obtaining a properly set picture after reflection on the mirror 8.

The individual magazines 9a, 9b, 9c, 9d are carried by supports 10 adapted to pivot round axes 11, distributed along an arcuate line 12 (FIG. 3). It should be remarked that the different magazines 9 form with their support 10 different angles so that the pivotal movement of the supports may bring the different magazines in the same predetermined position in front of the projecting system 7, after the manner of type bars of a typewriter. Said common operative position is illustrated in FIG. 3 for the magazine 9c, of which the inoperative position is illustrated by hatchings at 9c'.

The pivotal movement of each magazine is produced by a motor 14 associated therewith and the shaft of which carries a worm 15 meshing with a toothed sector 16 rigid with the support 10.

The above-described pivotal movement is only intended to bring the film near the projector. Starting from the position thus reached, each magazine is brought into its final operative position by a push-member illustrated diagrammatically at 13 in FIG. 3. Said push-member may be constituted by an electrically controlled jack wherein the rotary movement of an electric motor is transformed into the translational movement of a shaft, preferably with the interposition of torque-limiting means so as to prevent any exaggerated stressing when the magazine has reached its final operative position.

Each magazine 9 carries film-feed and take-up spools 17 and 18 (FIG. 4), said spools being driven by a feed sprocket 19 through the agency of free wheel transmissions illustrated as belts drawn in dot-and-dash lines in FIG. 4 at 20 and 21.

The feed sprocket 19 is rigid with a toothed wheel 22 driving, through the agency of the toothed wheels 23 and 24, the film-engaging claw mechanism 25 providing for the progression of the film 27 in front of the presser plate 26 carrying the projection gate. The magazine is provided in a side wall with openings 28 and 29, the objects of which will be disclosed hereinafter.

In its final operative position, the magazine is urged against the projecting system, as illustrated in dot-and-dash lines in FIG. 6. The projecting system includes a casing 30 containing the means for driving the film, an optic projector, means for the acoustic reproduction and control means, the details of which will be disclosed hereinafter.

The driving spindle 34 projects out of the wall of the casing 30 against which the magazine 9 is urged and this spindle provides through a screw-driver coupling 34a the drive of the feed sprocket 19, while a prism 31 also projects out of the casing 3 so as to reflect the luminous beam produced by a projecting lamp housed inside the casing 30, onto the film and into the objective 32. There is provided further an acoustic reading head 33 and a lamp 35 adapted to cooperate with a photocell 36 and with optic reference marks carried by the film and disclosed hereinafter.

FIG. 7 is a wiring diagram which allows understanding the operation of the apparatus, the electric circuit being reduced to a single wire, so as not to overcrowd the drawings. The different selecting keys 3 cooperate mechanically with a locking bar 37 adapted to prevent actuation of any further key after depression of the selected key.

The bar 37 is subjected to the action in opposite directions of a spring 38 and of an electromagnet 39.

Each key 3 actuates, when depressed, a switch 40 closing the circuit 41 producing forward operation of the motor 14 providing for the pivotal movement of the magazine 9 carrying the film associated with the depressed key, through the agency of a normally operative contact-piece 42, 43, the movable blade 43 of which is adapted to cooperate with an upkeep contact-piece 44.

When a magazine enters its final operative position illustrated in FIG. 6, it closes, through the agency of the push-member 35, a contact-piece 46 which shifts the movable blade 43 onto the contact-piece 44, so as to open the circuit 41 feeding the motor 14 and to energize the circuit 48 through the agency of a normally operative contact-piece 49, so as to energize the motor 47 driving a commutator constituted by a number of cams and associated switches. Said commutator includes a cam 50 adapted to open the above-mentioned contact-piece 49, so as to deenergize the circuit 48 feeding the motor 47. Said contact-piece 49 is shunted by a contact-piece 51 which is closed by a relay 52 when the latter is energized as occurs each time the luminous beam formed by the lamp 35 fitted in the projector 7 impinges on the photocell 36 through a transparent gate 54 provided in an opague strip 53 carried at the beginning and at the end of each film (FIG. 7). A further cam 55 of the commutator is adapted to actuate a contact-piece 55a inserted in the circuit 56 provided for the shifting of the push-member 13 which shifts a magazine 9 into its final operative position illustrated in FIG. 6. A cam 57 on the commutator actuates a contact-piece 57a controlling the circuit 58 which returns the push member 13 into its inoperative position.

A cam 59 actuates a contact-piece 59a ensuring through the circuit 60 the energization of the motor 61 serving for the unwinding of the film and the shaft 34 of which is coupled with the feed sprocket 19 of the magazine 9 which is set in its operative position.

A further cam 62 controls a contact-piece 62a ensuring the energization of the bulb 64 of the projecting system through its circuit 63.

A still further cam 65 controls a contact-piece 65a feeding the motor 67 which serves for the rewinding of the film, through the agency of the circuit 66. The motors 61 and 67 rotate preferably at different speeds and may form for instance two coaxial motors or again a single motor, providing for reversal of motion under different speed conditions.

The cam 68 controls the contact-piece 68a which ensures through the circuit 69 the return movement of the motor 14 controlling the pivotal movement of the magazine.

A last cam 70 actuates a contact-piece 70a energizing the circuit 71 feeding the electromagnet 39 operating the locking bar 37.

The above arrangement operates as follows:

The introduction of a coin into the slot 2 starts through a mechanism of a well-known type the operation of a key 3 selected after inspection of the reference marks 4 defining the corresponding films.

The depression of the selected key locks through the bar 37 all the other keys, as also known per se, and it produces a closing of the switch 40, so as to ensure the starting of the motor 14 producing the pivotal movement of the magazine 9 containing the selected film. At the end of this pivotal movement, the push member 45 closes the contact-piece 46, so as to shift the movable blade 43 away from the stationary contact-piece 42 onto the stationary contact-piece 44. The motor 14 is thus deenergized. At the same time, the motor 47 controlling the commutator is started through the normally operative contact-piece 49. The rotation of the commutator which executes obviously a complete revolution for each complete cycle of operation starts then the following sequence of operative steps.

The cam 55 closes the contact-piece 55a, so as to produce a progression of the push-member 13 during the time required for the passage of the latter from its pivoted position to its final operative position.

The cam 62 produces the illumination of the bulb 64 of the projector.

The cam 69 produces the starting of the motor 61 for the unwinding of the film.

The cam 50 opens then the contact-piece at 49, so as to deenergize the motor 47, whereby the commutator stops in the position reached by it. Consequently, the bulb 64 and the motor 61 continue operating so as to provide for the projection of the film.

When the projection of the film is at an end, the magazine considered and all the other parts of the apparatus should be returned into their starting position. However, since the duration of projection of the different films may not be identical, certain operations are controlled by the film itself.

When, at the end of the projection, the transparent gate 54 in the film allows the luminous beam from the lamp 35 to reach the cell 36, the relay 52 is energized and closes the contact-piece 51. This starts the motor 47 running again and the commutator also resumes its rotation and produces, through the cam 62, the deenergization of the projection bulb 64, through the cam 59, the stoppage of the motor 61 unwinding the film and, through the cam 65, the starting of the motor 67 for the speedy rewinding of the film, the claw mechanism being then inoperative and the claws remaining in their retracted position as provided by a catch providing for the drive of the mechanism in a single direction.

Immediately upon starting of the rewinding motor 67, the cam 50 opens again the contact-piece 40 which stops the motor 47 driving the commutator, since the relay 52 is no longer energized and the contact-piece 51 is also open.

The motor 67 remains thus energized until the beginning of the film is reached, which beginning is also provided with a transparent gate 54 passing between the lamp 35 and the cell 36. This reenergizes the relay 52 and closes the contact-piece 51, so as to make the motor 47 start again.

The continued rotation of the commutator produces then a stoppage of the rewinding motor 67 through the cam 65 and then a receding movement of the push-member 13 through the cam 67 and, finally, through the agency of the cam 68, a starting of the motor 14 in a reversed direction to make the magazine 9 pivot rearwardly and return into its starting position.

The pivotal movement of the magazine 9 opens the switch 46 which is however ineffective since the switch 43—44 is closed. The continued rotation of the commutator produces then, through the cam 70, the energization of the electromagnet 39 which shifts the locking bar 36, so as to allow the depressed key 3 to return into its starting position while releasing all the other keys.

At the same time, the switch 43—44 opens, so that the movable blade 43 returns into its position illustrated in FIG. 7. This movement of the movable blade 43 opens the circuit of the motor 47 which stops. The whole mechanism has thus returned then into its starting position so that it is possible to start a further cycle of operation through depression of any selected key 3.

Obviously, the embodiment described hereinabove and illustrated in the drawings is given solely by way of exemplification and by no means in a limiting sense and it is possible to modify in any suitable manner the shape, the nature, the arrangement and the mounting of its components without unduly widening thereby the scope of the invention as defined in the accompanying claims. Thus, it is possible to associate the arrangement disclosed with an electronic storing device or memory, which allows a preliminary selection of a plurality of films to be projected in succession in a predetermined order after introduction of a coin into the apparatus.

For instance also, the magazines containing the films may be stationary and a searching head forming a unit with a projector may be shifted along a vertical or horizontal axis for cooperation with the selected magazine; the projector is set automatically so as to face the reflecting mirror whatever may be the position assumed by such a unit.

It is also possible to project onto a normal screen and to remove the ground glass screen 5, a suitable adjustment of the projector 7 being then provided; this may be of a considerable interest for the execution of collective investigations in schools, conference halls or the like, in which case the apparatus does not require any skilled person for its operation and may be handled by the pupils themselves.

On the other hand, it is possible to design a similar apparatus of a smaller size intended for use at home after the manner of an electrophone associated with the vision in colors of the most remarkable orchestras and favorite artists.

In certain cases, and for certain particular uses which may be of a professional, educational or even of a military type, our improved apparatus may operate under remote control and release, through mere depression of a knob, a transmission adapted to be received by a miniature television set. Such a remotely controlled transmission would be produced by a station equipped for this purpose.

What I claim is:

1. An apparatus for the automatic projection of selected sound films comprising selecting means for manual selection of one of the sound films, a plurality of separated and independent magazines each carrying one of the sound films and normally lying each in an inoperative position on an arcuate line having an axis, separate supporting means for each magazine, stationary reproducing means having an axis separate from, offset with respect to, and substantially orthogonal to, the axis of said arcuate line, said reproducing means including a projecting system, a system for acoustic reading and reproduction comprising film-driving means, control means carried by each magazine for operatively connecting the film with the film-driving means, projecting system and acoustic reading and reproduction system upon engagementt of the magazine with the stationary reproducing means and automatic control means controlled by the selecting means adapted to shift by a compound pivotal and translational movement the magazine carrying the selected film into its operative position engaging the stationary reproduction means for projection and acoustic reproduction, each of said magazines forming with its supporting means an angle such as to bring said magazine in operative registry with said reproducing means upon completion of said shifting, said control means being further adapted to return said magazine into its inoperative position after said projection and acoustic reproduction and to thereafter return the selecting means into their original condition, each film being provided at its beginning and at its end with reference marks each consisting of a transparent gate formed in an opaque strip, and cycle-control means comprising a rotating commutator and a photocell cooperating with said reference marks.

2. An apparatus for the automatic projection of selected sound films comprising selecting means for manual selection of one of said sound films, a plurality of independent carriers, each of said carriers being connected to a supporting means, said carriers lying normally in their inoperative position on an arcuate line having an axis, reproducing means having an axis separate from, offset and substantially orthogonal with respect to the axis of said arcuate line, for projecting the film pictures and reproducing the acoustic signals on said film, compound means for shifting the carrier of the selected film out of its inoperative position into operative registry with said reproducing means, said compound means including separate means for pivoting each said carrier independently and separately through a pivotal movement around an axis lying on an arcuate line substantially concentric with and having about half the radius of the first mentioned arcuate line to make said carrier come near the reproducing means and means for shifting the carrier which has executed its pivotal movement through a translational movement into direct operative engagement with the reproducing means, each of said carriers forming with its supporting means an angle such as to bring said carrier in operative registry with said reproducing means upon completion of said shifting, and means for returning said carrier into its inoperative position after the end of the projection and reproduction of the sounds thereon, each film being provided at its beginning and at its end with reference marks each consisting of a transparent gate formed in an opaque strip, and cycle-control means comprising a rotating commutator and a photocell cooperating with said reference marks.

3. An apparatus for the automatic projection of selected sound films comprising selecting means for manual selection of one of the sound films, a plurality of separate magazines each carrying one of the sound films and normally lying each in an inoperative position on an arcuate line having an axis, stationary reproducing means having an axis separate from, and offset and orthogonal with respect to, the axis of said arcuate line and including a projecting system, a system for acoustic reading and reproduction and film-driving means, a separate motor for each magazine adapted to impart a pivotal movement to the corresponding magazine around separate axes to bring said magazine into a position near its operative position, a push-member adapted to urge translationally any of the magazines when brought into its pivoted position into operative engagement with the reproducing means, control means carried by each magazine for operatively connecting the film with the film-driving means, projecting system and acoustic reading and reproduction system upon engagement of the magazine with the stationary reproducing means, automatic control means controlled by the selecting means, and actuating in succession the motor for the magazine carrying the selected film and the push-member to shift the selected film magazine into operative position for projection and acoustic reproduction, and means whereby said control means return the apparatus into its inoperative condition after said projection and reproduction, each film being provided at its beginning and at its end with reference marks each consisting of a transparent gate formed in an opaque strip, and cycle-control means comprising a rotating commutator and a photocell cooperating with said reference marks.

4. An apparatus for the automatic projection of selected sound films comprising means for manual selection of one of the sound films, a plurality of separate magazines each carrying one of the sound films and normally lying each in an inoperative position on a arcuate line having an axis, stationary reproducing means having an axis separate from, and offset and orthogonal with respect to, the axis of said arcuate line and including a projecting system, a system for acoustic reading and reproduction and film-driving means for unwinding and rewinding the films, individual control means carried by each magazine for operatively connecting the film with the film-driving means, projecting system and acoustic reading and reproduction system upon engagement of the magazine with the stationary reproducsing means and automatic control means controlled by the selecting means adapted to shift by a compound pivotal and translational movement the magazine carrying the selected film into its operative position engaging the stationary reproducing means for driving the film, means whereby the unwinding and rewinding of the film by the film-driving means control the starting and the stopping of the operation of the projecting and reproduction system, and means whereby the control means return said magazine into its inoperative position after said projection and acoustic reproduction and thenafter return the selecting means into their original condition, each film being provided at its beginning and at its end with reference marks each consisting of a transparent gate formed in an opaque strip, and cycle-control means comprising a rotating commutator and a photocell cooperating with said reference marks.

5. An apparatus for the automatic projection of selected sound films, each provided with reference marks at its beginning and at its end, comprising means for manual selection of one of the sound films, a plurality of separate magazines each carrying one of the sound films and normally lying each in an inoperative position on an arcuate line having an axis, stationary reproducing means having an axis separate from, and offset and orthogonal with respect to, the axis of said arcuate line and including a projecting system, a system for acoustic reading and reproduction and film-driving means, control means carried by each magazine for operatively connecting the film with the film-driving means, projecting system and acoustic reading and reproduction system upon engagement of the magazine with the stationary reproducing means and automatic control means controlled by the selecting means adapted to shift by a compound pivotal and translational movement the magazine carrying the selected film into its operative position engaging the stationary reproducing means for projection and acoustic reproduction, a rotating commutator and a photocell carried by the sound reproduction system facing the path of the selected film, means whereby the registration between the photocell and the marks at the beginning and at the end of the film provide respectively the starting and the stopping of the projecting and reproduction system, and means whereby the control means return said magazine into its inoperative position after said projection and acoustic reproduction and thenafter return the selecting means into their original condition.

References Cited in the file of this patent

UNITED STATES PATENTS

| | | |
|---|---|---|
| 1,944,024 | Foster et al. | Jan. 16, 1934 |
| 2,180,639 | McMahon et al. | Nov. 21, 1939 |
| 2,227,259 | Hokanson | Dec. 31, 1940 |
| 2,322,489 | Von Madaler | June 22, 1943 |
| 2,354,199 | Collins | July 25, 1944 |
| 2,434,200 | Engelken | Jan. 6, 1948 |
| 2,527,967 | Schrader | Oct. 31, 1950 |
| 2,607,846 | Hubbard | Aug. 19, 1952 |
| 2,625,073 | Young et al. | Jan. 13, 1953 |